(12) United States Patent
Kim et al.

(10) Patent No.: US 8,492,022 B2
(45) Date of Patent: Jul. 23, 2013

(54) RECHARGEABLE BATTERY WITH BUFFER SHEET BETWEEN ELECTRODE ASSEMBLY AND BATTERY CASE

(75) Inventors: Hyo-Seob Kim, Yongin-si (KR); Yong-Sam Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 289 days.

(21) Appl. No.: 12/923,275

(22) Filed: Sep. 13, 2010

(65) Prior Publication Data

US 2011/0081573 A1 Apr. 7, 2011

Related U.S. Application Data

(60) Provisional application No. 61/272,579, filed on Oct. 7, 2009.

(51) Int. Cl.
*H01M 2/18* (2006.01)

(52) U.S. Cl.
USPC .......... 429/130; 429/131; 429/163; 429/180; 429/186

(58) Field of Classification Search
USPC .................. 429/163, 180, 186, 130, 131
See application file for complete search history.

(56) References Cited

U.S. PATENT DOCUMENTS

| | | | |
|---|---|---|---|
| 3,773,557 A | 11/1973 | Mead | |
| 5,234,779 A * | 8/1993 | Mix et al. | 429/186 |
| 6,083,640 A * | 7/2000 | Lee et al. | 429/94 |
| 6,743,546 B1 | 6/2004 | Kaneda et al. | |
| 7,485,392 B2 | 2/2009 | Kim | |
| 2004/0191612 A1 * | 9/2004 | Akita et al. | 429/94 |
| 2006/0024578 A1 | 2/2006 | Lee | |
| 2006/0099504 A1 | 5/2006 | Kim | |
| 2006/0214632 A1 | 9/2006 | Lee et al. | |
| 2007/0196729 A1 * | 8/2007 | Yamauchi et al. | 429/130 |
| 2008/0070097 A1 | 3/2008 | Uh | |
| 2008/0160399 A1 | 7/2008 | Kim et al. | |
| 2010/0233521 A1 | 9/2010 | Byun et al. | |
| 2012/0015217 A1 | 1/2012 | Lee et al. | |

FOREIGN PATENT DOCUMENTS

| | | |
|---|---|---|
| CN | 1753214 A | 3/2006 |
| CN | 1838473 A | 9/2006 |
| EP | 1043782 A2 | 10/2000 |
| EP | 1202371 A1 | 5/2002 |
| EP | 2228852 A1 | 9/2010 |
| JP | 07-130393 A | 5/1995 |
| JP | 09-283112 A | 10/1997 |
| JP | 10-189028 A | 7/1998 |
| JP | 11-121040 A | 3/1999 |
| JP | 2000150306 A * | 5/2000 |

(Continued)

OTHER PUBLICATIONS

European Office Action in EP 10181694.0-2119, dated Jun. 7, 2011 (Kim, et al.).
European Extended Search Report in EP 10181694.0-1227, dated Dec. 28, 2010 (Kim, et al.), European Office Action from prosecution of corresponding European application.
Korean Office Action in KR 10-2010-0095323, dated Jan. 26, 2012 (Kim, et al.).
Korean Office Action in KR 10-2010-0095323, dated Aug. 31, 2012 (Kim, et al.).
Japanese Office Action dated Nov. 27, 2012.
Chinese Office Action in CN 201010501845.0 dated Dec. 26, 2012 (Kim, et al.).

*Primary Examiner* — Zachary Best
(74) *Attorney, Agent, or Firm* — Lee & Morse, P.C.

(57) ABSTRACT

A rechargeable battery includes an electrode assembly in a battery case, and a buffer sheet between the electrode assembly and the battery case, the buffer sheet contacting the electrode assembly and the battery case.

19 Claims, 9 Drawing Sheets

FOREIGN PATENT DOCUMENTS

| | | |
|---|---|---|
| JP | 2001-357893 A | 12/2001 |
| JP | 2004-207089 A | 7/2004 |
| JP | 3602797 B2 | 10/2004 |
| JP | 2006-278333 A | 10/2006 |
| JP | 2008-040901 A | 2/2008 |
| JP | 2008-166243 A | 7/2008 |
| JP | 2010-212241 A | 9/2010 |
| KR | 10 2008-0024858 A | 3/2008 |
| WO | WO 00/59063 A1 | 10/2000 |

* cited by examiner

RECHARGEABLE BATTERY WITH BUFFER SHEET BETWEEN ELECTRODE ASSEMBLY AND BATTERY CASE

CROSS-REFERENCE TO RELATED APPLICATION

This application claims priority to U.S. Provisional Application No. 61/272,579, filed in the U.S. Patent and Trademark Office on Oct. 7, 2009, and entitled "Rechargeable Battery," which is incorporated by reference herein in its entirety and for all purposes.

BACKGROUND

1. Field

Example embodiments relate to a rechargeable battery. More particularly, example embodiments relate to a rechargeable battery with a structure capable of absorbing or damping impact and vibrations with respect to an electrode assembly.

2. Description of the Related Art

A rechargeable battery differs from a primary battery in that it can be repeatedly charged and discharged, while the primary battery cannot, i.e., the primary battery makes only an irreversible conversion of chemical to electrical energy. A low-capacity rechargeable battery may be used as a power supply for small electronic devices, e.g., cellular phones, notebook computers, and camcorders, while a high-capacity rechargeable battery may be used as a power supply for large devices, e.g., for driving motors in hybrid vehicles and the like.

A high-power rechargeable battery using a non-aqueous electrolyte with a high energy density has been recently developed. For example, the high-power rechargeable battery may be constructed with a high-capacity rechargeable battery having a plurality of rechargeable cells coupled to each other in series, such that it can be used as the power supply for driving motors in electrical vehicles requiring high power.

A conventional rechargeable battery may include an electrode assembly with positive and negative electrodes and a separator interposed between the two electrodes, a case mounting the electrode assembly therein, and positive and negative terminals electrically connected to the electrode assembly and protruded to the outside of the case. The rechargeable battery may have a cylindrical shape, a prismatic shape, a pouch shape, etc.

The above information disclosed in this Description of the Related Art section is only for enhancement of understanding of the background of the invention and therefore it may contain information that does not form the prior art that is already known in this country to a person of ordinary skill in the art.

SUMMARY

Embodiments are directed to a rechargeable battery, which substantially overcomes one or more of the problems due to the limitations and disadvantages of the related art.

It is therefore a feature of an embodiment to provide a rechargeable battery with a buffer sheet configured to absorb vibrations.

At least one of the above and other features and advantages may be realized by providing a rechargeable battery, including an electrode assembly in a battery case, and a buffer sheet between the electrode assembly and the battery case, the buffer sheet contacting the electrode assembly and the battery case.

The rechargeable battery may further include electrode terminals electrically connected to the electrode assembly, the buffer sheet and the electrode terminals being on opposite sides of the electrode assembly. The buffer sheet may be a continuous flexible sheet extending at least along three different surfaces of the battery case. The buffer sheet may overlap at least five different surfaces of the electrode assembly. The buffer sheet may be configured to deform when positioned inside the battery case. The buffer sheet may contact the battery case and first and second electrode tabs, the first and second electrode tabs connecting the electrode assembly to respective first and second electrode terminals, and the buffer sheet being between the battery case and respective ones of the first and second electrodes tabs.

The buffer sheet may include at least one plate connected to springs, the plate contacting the electrode assembly, and the springs extending between the plate and the battery case and configured to deform when contacting the battery case. The springs may extend along lateral edges of the plate and are angled with respect to the plate, the springs extending from the plate along respective sidewalls of the battery case. The springs may curve away from the electrode assembly, the plate being between the springs and the electrode assembly. The rechargeable battery may further include an insulator between the springs and the electrode assembly. The buffer sheet may include three plates overlapping three different surfaces of the electrode assembly, each plate including springs on opposite edges and contacting opposite surfaces of the battery case. The springs of the three plates may overlap only two different surfaces of the battery case. The three plates of the buffer sheet may extend along a bottom surface and two side surfaces of the battery case to have an inverted Π shape. Two of the three plates may contact first and second electrode tabs, the first and second electrode tabs connecting the electrode assembly to electrode terminals. The buffer sheet may include a first plate facing a bottom of the battery case and second and third plates facing sidewalls of the battery case, the first through third plates being integral. A sum of widths of the at least one plate and the springs may be equal to or larger than a width of the battery case. A bottom of the battery case may be curved, and a width of the buffer sheet is larger than a width of the curved bottom of the battery case.

BRIEF DESCRIPTION OF THE DRAWINGS

The above and other features and advantages will become more apparent to those of ordinary skill in the art by describing in detail exemplary embodiments with reference to the attached drawings, in which.

Figure 1:
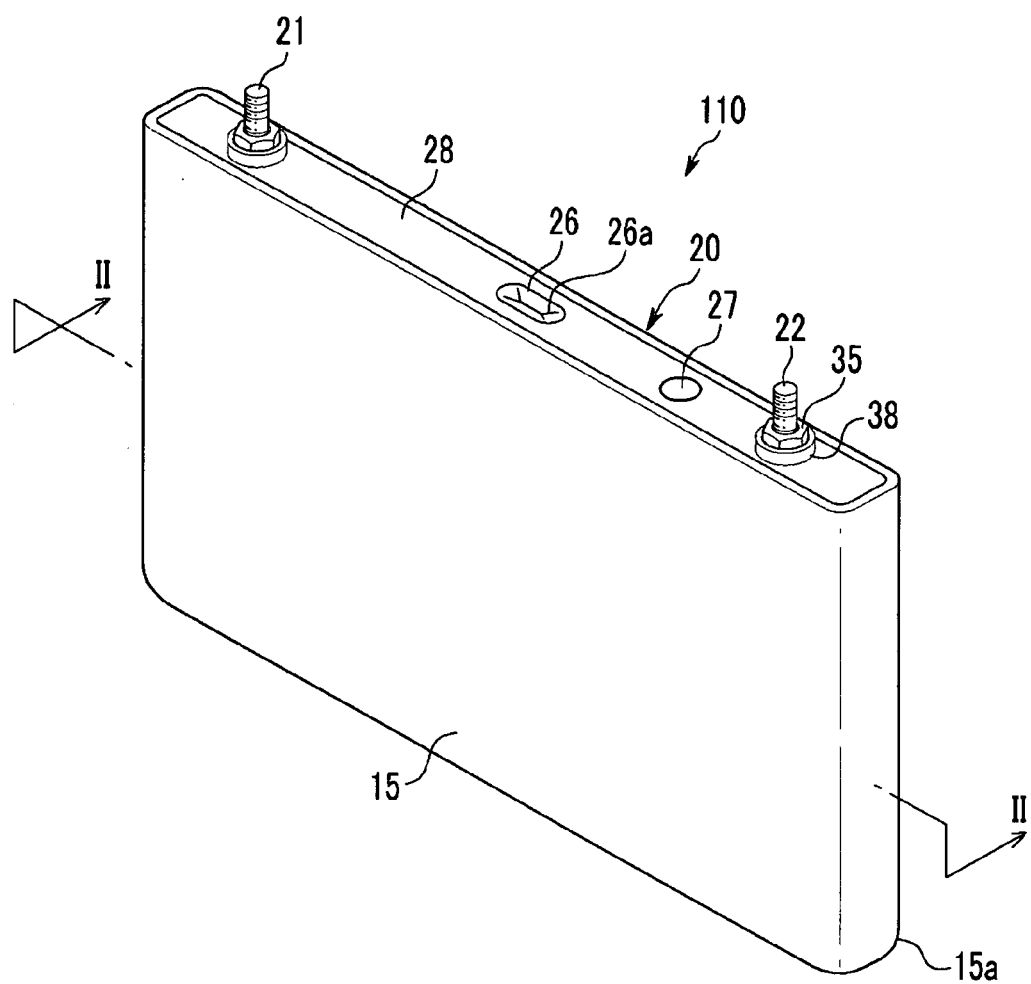
FIG. 1 illustrates a perspective view of a rechargeable battery according to a first exemplary embodiment.

| Reference Numerals Indicating Primary Elements in the Drawings | |
|---|---|
| 110, 120: rechargeable battery | 10: electrode assembly |
| 11: positive electrode | 11a: positive uncoated region |
| 12: negative electrode | 12a: negative uncoated region |
| 13: separator | 15: case |
| 15a: rounded portion | 15b: bottom surface |
| 15c: lateral surface | 20: cap assembly |
| 21: positive terminal | 22: negative terminal |
| 28: cap plate | 31, 32: lead tab |
| 31a, 32a: tab hole | 40, 50, 60: buffer sheet |
| 41, 51, 61: bottom support plate | 42, 52, 62: bottom spring |
| 43, 53, 63: side support plate | 45, 55, 65: side spring |
| 63a: support plate hole | 67: insulating film |

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
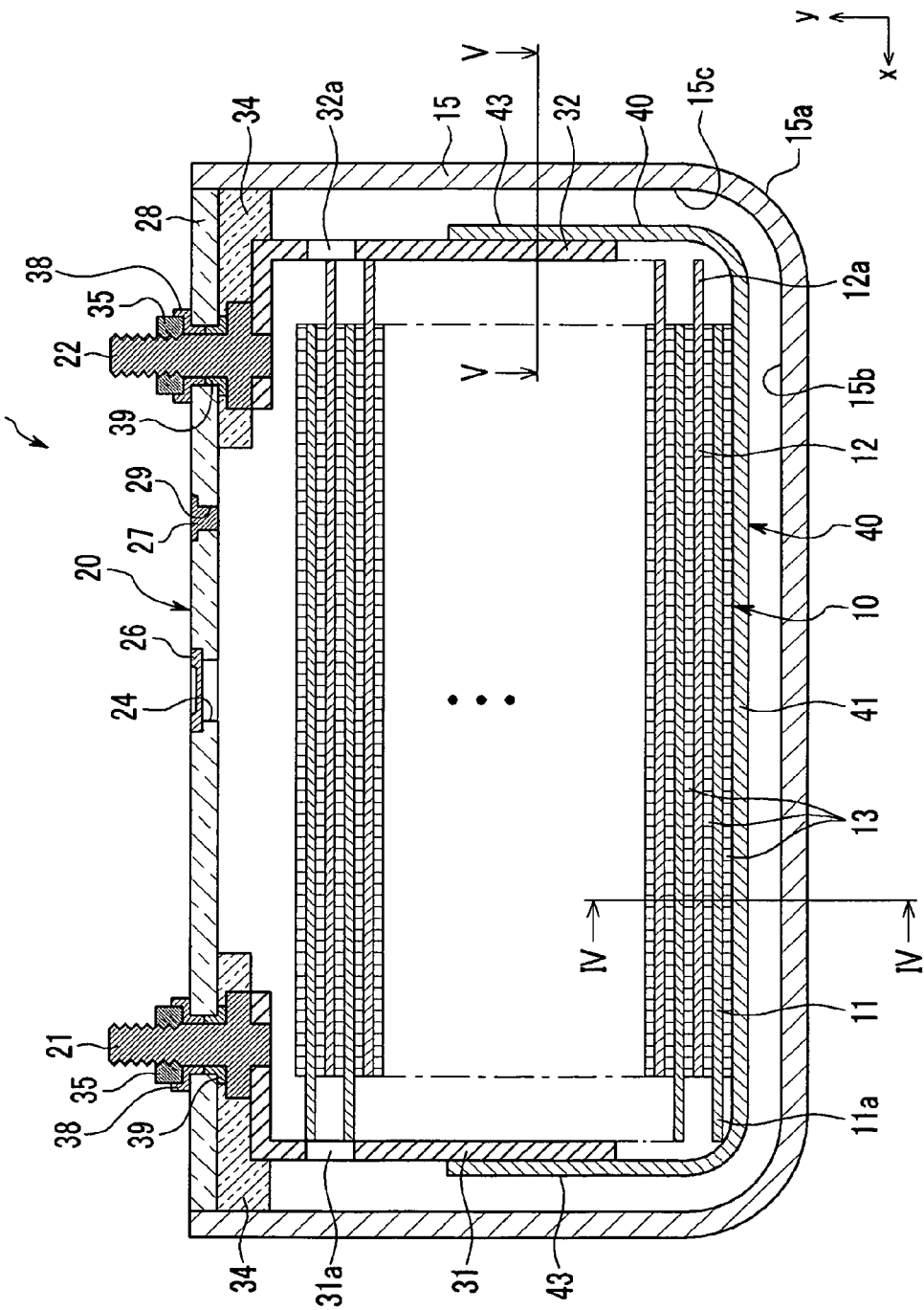
FIG. 2 illustrates a cross-sectional view of the rechargeable battery taken along line II-II of FIG. 1.

FIG. 1 illustrates a perspective view of a rechargeable battery according to a first exemplary embodiment. FIG. 2 illustrates a cross-sectional view of the rechargeable battery along line II-II of FIG. 1.

Referring to FIG. 1 and FIG. 2, a rechargeable battery 110 according to a first exemplary embodiment may include an electrode assembly 10 performing charging and discharging operations, a case 15 mounting the electrode assembly 10 therein, and a cap assembly 20 sealing the case 15. A lithium ion battery is exemplified as the rechargeable battery 110 according to the first exemplary embodiment. However, exemplary embodiments are not limited thereto, and may be applied to various types of batteries, e.g., a lithium polymer battery.

The electrode assembly 10 may include wound positive and negative electrodes 11 and 12, and a separator 13 therebetween. The positive electrode 11, the negative electrode 12, and the separator 13 may be band-shaped, and may be elongated in one direction. However, example embodiments are not limited thereto, and the electrode assembly 10 may be structured to have a plurality of positive and negative electrodes 11 and 12 alternately deposited while interposing a separator 13 therebetween.

The positive electrode 11 may include a positive current collector and a positive active material-based layer formed on the positive current collector. A positive uncoated region 11a with no positive active material may be formed along a one-sided lateral end of the positive electrode 11 in a longitudinal direction thereof.

The negative electrode 12 may include a negative current collector and a negative active material-based layer formed on the negative current collector. A negative uncoated region 12a with no negative active material may be formed along a one-sided lateral end of the negative electrode 12 in a longitudinal direction thereof.

The case 15 defines an exterior of the rechargeable battery 110 and provides a space for mounting the electrode assembly 10. For example, the case 15 may have a cuboid shape having a one-sided opening for receiving a cuboid-shaped electrode assembly 10 therein. A rounded portion 15a of the case 15 bent in a shape of an arc may be formed at each edge of the case 15, i.e., a contact region between each two surfaces of the case 15 may have a rounded portion 15a along the contact region. For example, the rounded portion 15a may be formed in a shape of an arc with a radius of about 2 mm or more at a bottom of the case 15. However, example embodiments are not limited thereto, and the case 15 may be formed with various shapes, e.g., a cylindrical shape, a pouch shape, etc. For example, the case 15 may be formed of metal, e.g., aluminum, aluminum alloy, nickel-plated steel, etc., or of a pouched laminate film.

The cap assembly 20 may include a cap plate 28 fitted to the opening of the case 15, a positive terminal 21 electrically connected to the positive electrode 11 and protruding to the outside of the case 15, and a negative terminal 22 electrically connected to the negative electrode 12 and protruding to the outside of the case 15.

The cap plate 28 may be plate-shaped and may be fitted to the opening of the case 15. A sealing cork 27 may be provided in an electrolyte injection hole 29 of the cap plate 28. A vent plate 26 with a notch 26a may be provided in a vent hole 24 of the cap plate 28, so the vent plate 26 may open under a predetermined pressure.

The positive and the negative terminals 21 and 22 may be electrically connected to the electrode assembly 10, and may protrude to the outside of the case 15. The positive and the negative terminals 21 and 22 may pass through the cap plate 28, and flanges under the positive and the negative terminals 21 and 22 may be supported at the bottom of the cap plate 28. External portions of the positive and the negative terminals 21 and 22 outside the case 15, i.e., outer circumference of the upper pillar protruded to the outside of the cap plate 28, may be screw-processed. Nuts 35 may be coupled to the external portions of the positive and the negative terminals 21 and 22, while supporting the positive and the negative terminals 21 and 22 from the top side. Upper and lower gaskets 38 and 39 may be installed between the cap plate 28 and, e.g., each of, the positive and the negative terminals 21 and 22, so as to seal and insulate each of the positive and the negative terminals 21 and 22 from the cap plate 28.

The positive terminal 21 may be electrically connected to the positive electrode 11 via a first lead tab 31. The negative terminal 22 may be electrically connected to the negative electrode 12 via a second lead tab 32. The first and second lead tabs 31 and 32 may be disposed along lateral ends of the electrode assembly 10. Tab holes 31a and 32a may be formed in the first and second lead tabs 31 and 32, respectively, so as to discharge gas therethrough. A lower insulating member 34 may be disposed under the cap plate 28, so bottom ends of the positive and negative terminals 21 and 22, as well as top ends of the first and second lead tabs 31 and 32, may be inserted into the lower insulating member 34. Therefore, the first lead tab 31 may electrically interconnect the positive terminal 21 and the positive electrode 11, and the second lead tab 32 may electrically interconnect the negative terminal 22 and the negative electrode 12.

A buffer sheet 40 may be installed between the electrode assembly 10 and the case 15 for support, e.g., the buffer sheet 40 may be external to the electrode assembly 10 and may be a discrete element with respect to the electrode assembly 10. That is, the buffer sheet 40 may be, e.g., only, in a lower portion of the case 15 along bottom and/or lateral surfaces 15b and 15c of the case 15, so as to support the electrode assembly 10 against the case 15, e.g., while maintaining an empty space between the electrode assembly 10 and the case 15 in an upper portion of the case 15. The buffer sheet 40 will be described in more detail below with reference to FIGS. 3-5.

Figure 3:
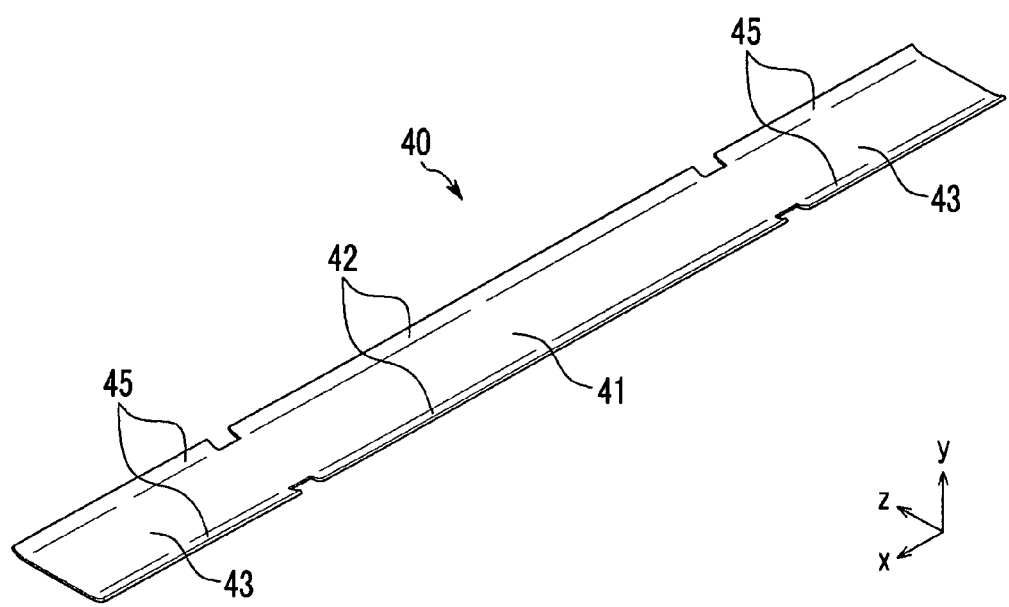
FIG. 3 illustrates a perspective view of a buffer sheet before being inserted into a rechargeable battery according to a first exemplary embodiment.

FIG. 3 illustrates a perspective view of the buffer sheet 40 before insertion into the rechargeable battery 110 according to the first exemplary embodiment. Referring to FIGS. 2 and 3, the buffer sheet 40 may include at least one support plate with deformable springs between the support plate and the case 15, e.g., a bottom support plate 41 and/or a side support plate 41. For example, the buffer sheet 40 may include a bottom support plate 41, a side support plate 43, bottom springs 42, and side springs 45, so the bottom springs 42 may be installed between the bottom support plate 41 and the case 15, while the side springs 45 may be installed between the side support plate 43 and the case 15. The bottom and side springs 42 and 45 may be elastically deformed between the case 15 and a respective support plate.

In further detail, as illustrated in FIGS. 2-3, the buffer sheet 40 may include the bottom support plate 41 facing the bottom surface 15b of the case 15 and the side support plates 43 facing the lateral surfaces 15c of the case 15. Further, the buffer sheet 40 may include the bottom springs 42 pressing the bottom support plate 41 against the case 15 and the side springs 45 pressing the side support plate 43 against the case 15. The buffer sheet 40 may be formed of a flexible material. For example, the buffer sheet 40 may be formed of a polymer, e.g., polypropylene and/or polyethylene, or a laminate film having a metal film coated with a polymer film on each surface.

The buffer sheet 40 may be originally, i.e., before installation within the case 15, plate-shaped, and may have an elongated shape, e.g., an approximate rectangular shape. For example, one side support plate 43 with the side springs 45 attached thereto may be connected to each end of the bottom support plate 41, i.e., the bottom support plate 41 with the bottom springs 42 attached thereto may be between the two side support plates 43, to form a single integral structure having a rectangular shape. In other words, the bottom and side springs 42 and 45 may be integrally formed with respective bottom and side support plates 41 and 43, and may define a substantially flat structure with respective bottom and side support plates 41 and 43. When the buffer sheet 40 is mounted within the case 15, the support plate 41 may extend along the bottom surface 15b of the case 15, e.g., the bottom support plate 41 may directly contact a bottom of the electrode assembly 10, and the side support plates 43 may bend, e.g., perpendicularly with respect to the bottom support plate 41, to extend along respective side surfaces 15c of the case 15, e.g., the side support plates 43 may directly contact respective first and second lead tabs 31 and 32 and extend to overlap the respective first and second lead tabs 31 and 32. Accordingly, in a bent state, i.e., after installation within the case 15, the buffer sheet 40 may have an approximate inverted-Π shape that supports a lower portion of the electrode assembly 10.

It is noted that the bottom and the side springs 42 and 45 are not formed at the regions where the bottom support plate 41 and the side support plates 43 are connected to each other. In other words, as illustrated in FIG. 3, spaces may be formed between each bottom spring 42 and an adjacent side spring 45, so a bending portion between the bottom support plate 41 and a respective side support plate 43, e.g., a region corresponding to the rounded portion 15a of the case 15, may not contact the case 15 via a spring. Accordingly, the side support plates 43 may be easily bent with respect to the bottom support plate 41.

The bottom springs 42 may be formed along both lateral edges of the bottom support plate 41, e.g., to define a substantially flat structure with the bottom support plate 41 before installation within the case 15, and may be elastically deformable to contact inner side surfaces 15d of the case 15, i.e., when installed within the case 15. The bottom springs 42 may be plate-shaped while elongated along both lateral edges of the bottom support plate 41, and may contact and extend along the inner side surfaces 15d of the case 15 to space the bottom support plate 41 from the inner side surfaces 15d of the case 15 by a predetermined distance. The bottom springs 42 may be formed in the shape of a plate spring, and may be elastically deformed depending upon pressure applied thereto.

The side springs 45 may be formed along both lateral edge of the side support plates 43, e.g., to define a substantially flat structure with the side support plate 43 before installation within the case 15, and may be elastically deformable to contact inner side surfaces 15d of the case 15, i.e., when installed within the case 15. The side springs 45 may be plate-shaped while elongated along the lateral edges of the side support plates 43, and may contact and extend along the inner side surfaces 15d of the case 15 to space the side support plates 43 from the inner side surfaces 15d of the case 15 by a predetermined distance. The side springs 45 may be formed in the shape of a plate spring, and may be elastically deformed depending upon pressure applied thereto.

Figure 4:
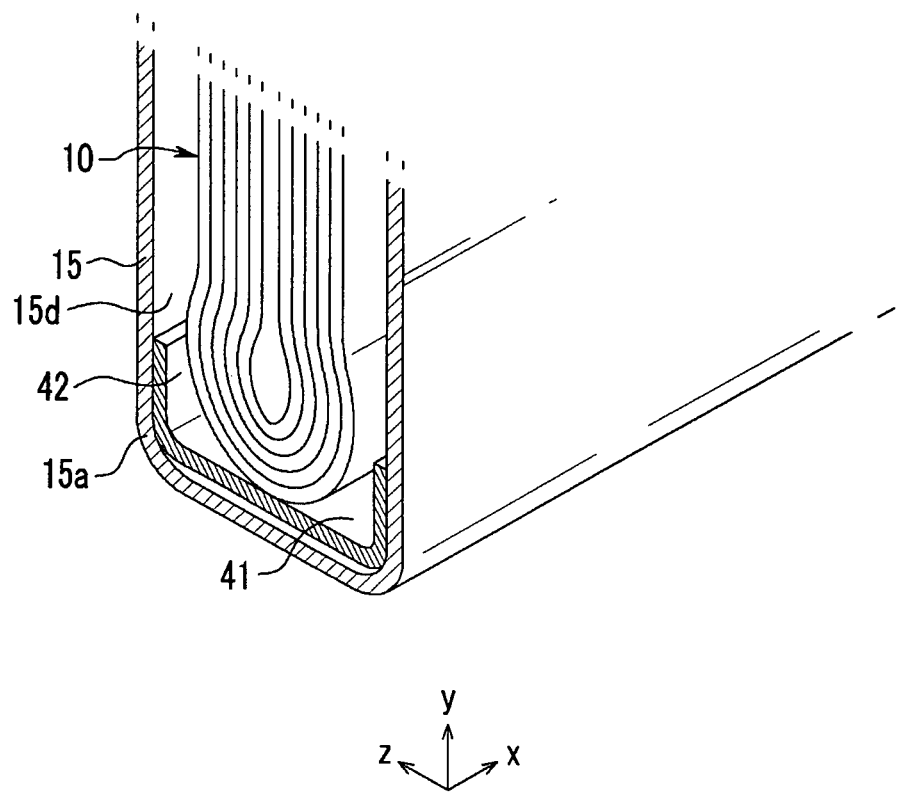
FIG. 4 illustrates a vertical partial cut-away perspective view of a rechargeable battery according to a first exemplary embodiment.
Figure 5:
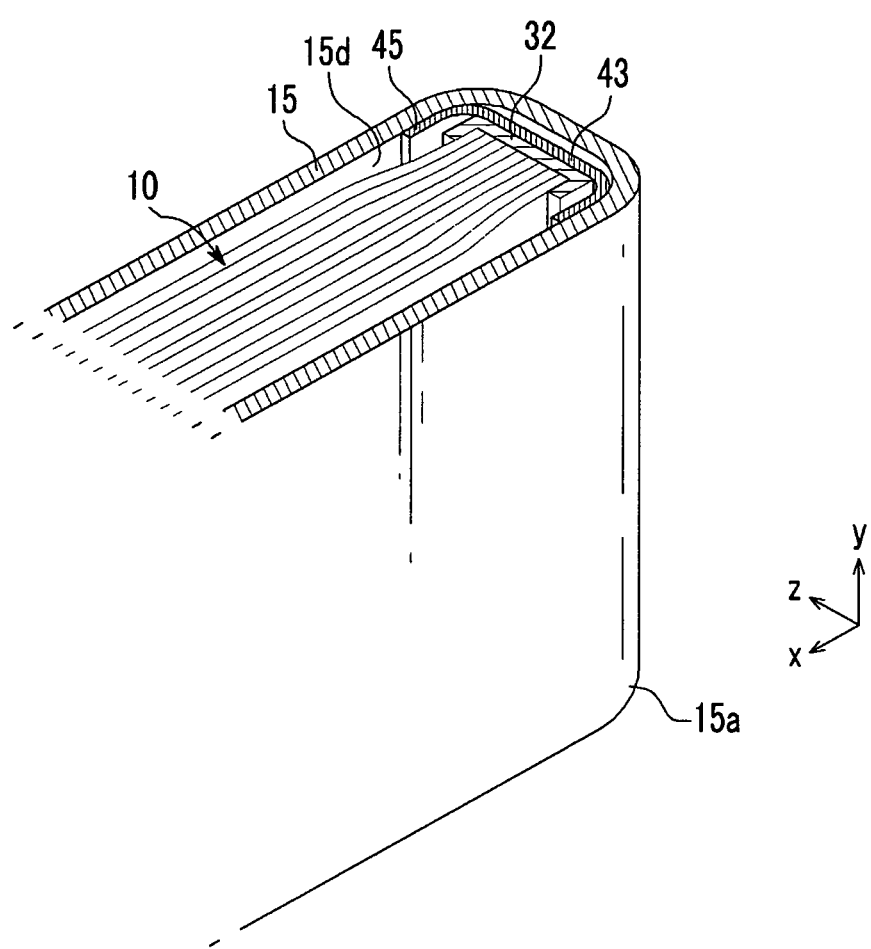
FIG. 5 illustrates a horizontal partial cut-away perspective view of a rechargeable battery according to a first exemplary embodiment.

A detailed description of the buffer sheet 40 within the case 40 and its effects will be described with reference to FIGS. 4-5. FIG. 4 illustrates a partial cut-away perspective view of the rechargeable battery 110 according to the first exemplary embodiment taken in the vertical direction, i.e., to illustrate the battery as viewed in the yz-plane. FIG. 5 illustrates a partial cut-away perspective view of the rechargeable battery 110 according to the first exemplary embodiment taken in the horizontal direction, i.e., to illustrate the battery as viewed in the xz-plane.

A sum of widths of the bottom support plate 41 and the bottom springs 42 along the z-axis in an uninstalled stated, as illustrated in FIG. 3, may be larger than or the same as an inner width of the case 15 along the z-axis. It is noted that the inner width of the case 15 along the z-axis is measured in a region above the rounded portions 15a of the case 15.

In case the sum of widths of the bottom support plate 41 and the bottom springs 42 is larger than the inner width of the case 15, as illustrated in FIG. 4, the bottom springs 42 may be deformed while contacting the inner side surfaces 15d of the case 15 at both edges thereof so as to space the bottom support plate 41 from the case 15. In other words, when the bottom support plate 41 is installed within the case 15, the bottom springs 42 may be pushed by the inner side surfaces 15d to angle with respect to the bottom support plate 41. As such, the bottom springs 42 may extend along the inner side surfaces 15d of the case to space the bottom support plate 41 of the buffer sheet from the case 15.

In case the sum of widths of the bottom support plate 41 and the bottom springs 42 is the same as the inner width of the case 15, the bottom springs 42 may be deformed by the rounded portions 15*a* of the case 15, thereby being tightly compressed between facing inner surfaces 15*d* of the rounded portions 15*a*. As the inner width of the case 15 is gradually reduced at the rounded portions 15*a*, the width of the buffer sheet 40 may be larger than a width of the case 15 at the rounded portions 15*a*. As such, the bottom springs 42 may contact the inner surface 15*d* of the case 15, and the bottom support plate 41 may be spaced apart from the bottom of the case 15 by a predetermined distance. The case 15 may be rounded in the shape of an arc with a radius of about 2 mm or more, and the bottom springs 42 may have a greater curvature radius than the rounded portions 15*a*.

As the bottom springs 42 are tightly supported between side surfaces 15*d* of the case 15 and the bottom support plate 41, and the bottom support plate 41 is tightly adhered to the bottom of the electrode assembly 10, the bottom support plate 41 may stably support the electrode assembly 10 in upward and downward directions, e.g., along the vertical direction. Further, when external impact or vibration is applied to the case 15, the bottom support plate 41 and the bottom springs 42 may stably prevent the electrode assembly 10 from being shaken. That is, the tightened bottom springs 42 between the lower portion of the case 15 and the bottom of the electrode assembly 10, i.e., via the bottom support plate 41, may secure the electrode assembly 10 and prevent its movement in the vertical direction.

A sum of widths of the side support plates 43 and the side springs 45 along the z-axis in an uninstalled stated, as illustrated in FIG. 3, may be larger than or the same as the inner width of the case 15 along the z-axis. In case the sum of widths of the side support plates 43 and the side springs 45 is larger than the inner width of the case 15, as illustrated in FIG. 5, the side springs 45 may be deformed while contacting the inner side surfaces 15*d* of the case 15 at both ends thereof, so as to space the side support plates 43 from the case 15 with a distance. In case the sum of width of the side support plates 43 and the side springs 45 is the same as the inner width of the case 15, the side springs 45 may be deformed while contacting the inner side surfaces 15*d* in within the rounded portions 15*a* of the case 15.

As the side springs 42 are tightly supported against side surfaces 15*d* of the case 15, and the side support plates 43 are tightly adhered to lateral surfaces of the electrode assembly 10, the side support plates 43 may laterally support the electrode assembly 10 in a stable manner. Furthermore, even under application of an external impact or vibration, the side support plates 43 and the side springs 45 may stably prevent the electrode assembly 10 from being shaken.

As described above, a rechargeable battery according to exemplary embodiments may include the buffer sheet 40 with at least one support plate contacting the electrode assembly 10 and springs extending between the support plate and the case 15. As the electrode assembly 10 is stably supported by the buffer sheet 40, impact absorbing and/or vibration damping of the rechargeable battery 110 may be improved by way of the buffer sheet 40. Accordingly, an increased contact resistance between the terminals 21 and 22 and the electrode assembly 10 due to impact or vibration may be prevented.

In contrast, when an electrode assembly is mounted within a case and electrically connected to terminals in a conventional rechargeable battery, the electrode assembly may be shaken due to an external impact or vibration, thereby damaging its electrical connection to the terminals. When a contact resistance between the electrode assembly and the terminals increases, the output of the rechargeable battery may be reduced and a large amount of heat, i.e., due to the high resistance, may be generated to increase the temperature of the rechargeable battery. When the temperature of the rechargeable battery is increased, performance characteristics of the rechargeable battery may be deteriorated, or the rechargeable battery may explode due to the continual elevation in temperature. Furthermore, in case the electrode assembly is broken or torn due to the external impact, an inner short may occur, thereby increasing the internal temperature of the rechargeable battery.

Figure 6:
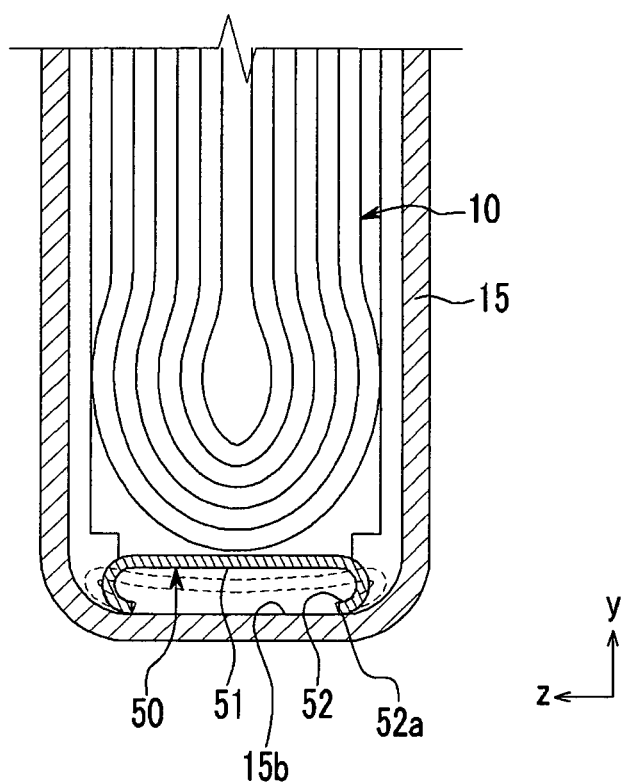
FIG. 6 illustrates a vertical sectional view of a rechargeable battery according to a second exemplary embodiment.
Figure 7:
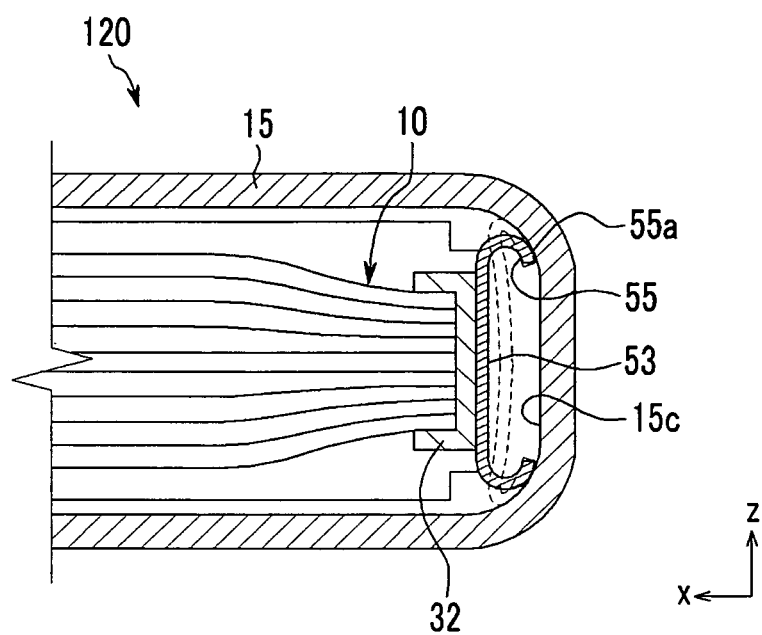
FIG. 7 illustrates a horizontal sectional view of a rechargeable battery according to a second exemplary embodiment.

FIG. 6 illustrates a vertical sectional view of a rechargeable battery according to a second exemplary embodiment. FIG. 7 illustrates a horizontal sectional view of a rechargeable battery according to a second exemplary embodiment.

Referring to FIG. 6 and FIG. 7, a rechargeable battery 120 according to the second exemplary embodiment may be substantially the same in structure as the rechargeable battery 110 of the first exemplary embodiment described previously with reference to FIGS. 1-5, except for a buffer sheet 50. Therefore, repeated descriptions of same elements will not be repeated.

The buffer sheet 50 according to the second exemplary embodiment may include a bottom support plate 51, bottom springs 52 formed along both lateral edges of the bottom support plate 51, side support plates 53 connected to the longitudinal ends of the bottom support plate 51, and side springs 55 formed along both lateral edges of the side support plates 53. The structures of the bottom and side support plates 51 and 53 may be substantially the same as the bottom and side support plates 41 and 43 of the rechargeable battery 110 described previously with reference to FIGS. 1-5, e.g., the bottom support plate 51 may be connected between two side support plates 53 to form an integral rectangular structure.

In detail, the bottom support plate 51 may be plate-shaped, and may be elongated along the bottom surface 15*b* of the case 15. The bottom support plate 51 may face the inner bottom surface of the case 15 and may contact the bottom of the electrode assembly 10. The bottom springs 52 may be plate-shaped and may be elongated along both lateral edges of the bottom support plate 51 by two. That is, as illustrated in FIG. 6, the bottom springs 52 may be bent by 180 degrees toward the case 15, such that a top surface 52*a* of the bottom spring 52 may contact the bottom surface 15*b* of the case 15 to form the letter "C."

The bent portion of the bottom spring 52 may be elastically deformed. The bent bottom springs 52 may exhibit enhanced elasticity, and accordingly, may stably support the electrode assembly 10 in upward and downward directions, i.e., along the vertical direction, when an external impact or vibration is applied to the bottom support plate 51. For example, when an external force forces the electrode assembly 10 to vibrate against the bottom support plate 51, the bottom support plate 51 may bend, i.e., as illustrated by the dashed line in FIG. 6, thereby absorbing the vibrations and preventing contact between the electrode assembly 10 and the bottom 15*b* of the case 15.

As illustrated in FIG. 7, the side support plate 53 may be plate-shaped and elongated along the side surface 15*c* of the case 15. The side support plate 53 may face the inner surface of the case 15 and may contact a lateral side of the electrode assembly 10 placed inwardly. The side springs 55 may be elongated along both lateral edges of the side support plate 53 by two. That is, the side springs 55 may be bent toward the case 15 by 180 degrees, such that a top surface 55*a* of the side spring 55 may contact the side surface 15*c* of the case 15 to form the letter "C."

The bent portion of the side springs 55 may be elastically deformed. The bent side springs 55 may exhibit enhanced elasticity, and accordingly, the side support plates 53 may laterally support the electrode assembly 10 in a stable manner.

Figure 8:
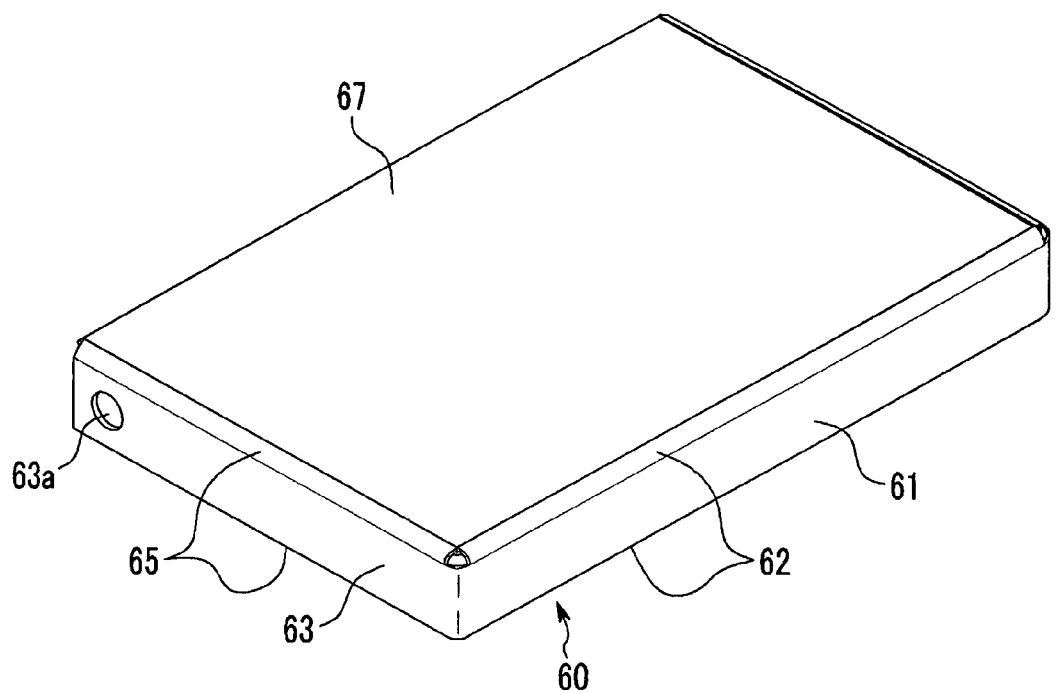
FIG. 8 illustrates a perspective view of a buffer sheet of a rechargeable battery according to a third exemplary embodiment.
Figure 9:
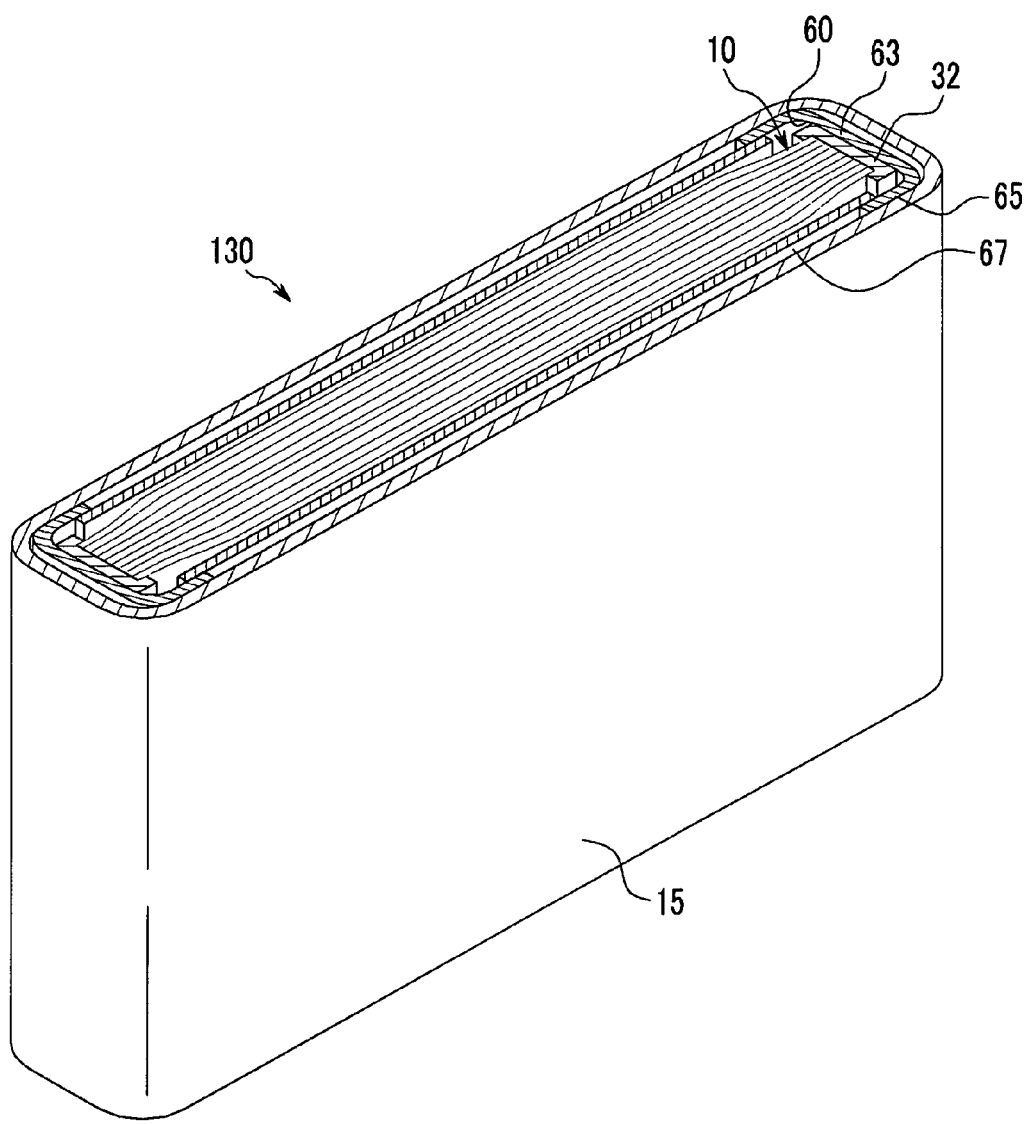
FIG. 9 illustrates a horizontal cut-away perspective view of a rechargeable battery according to a third exemplary embodiment.

FIG. 8 illustrates a perspective view of a buffer sheet for a rechargeable battery according to a third exemplary embodiment. FIG. 9 illustrates a horizontal cut-away perspective view of a rechargeable battery according to the third exemplary embodiment.

Referring to FIG. 8 and FIG. 9, a rechargeable battery 130 according to the third exemplary embodiment is substantially the same in structure as the rechargeable battery 110 of the first exemplary embodiment, except for additionally including a buffer sheet 60 and an insulating film 67. Therefore, descriptions of same elements will not be repeated.

The buffer sheet 60 may include a bottom support plate 61 facing the bottom of the case 15, bottom springs 62 formed along both lateral edges of the bottom support plate 61, side support plates 63 facing the lateral surfaces of the case 15, and side springs 65 formed along both lateral edges of the side support plates 63. Further, the insulating film 67 may be fixed to the bottom springs 62 and the side springs 65, e.g., by way of thermal fusion.

In detail, the insulating film 67 may be attached to the two bottom springs 62 and the side springs 65, respectively. For example, as illustrated in FIGS. 8-9, the side springs 65 may be positioned between the insulating film 67 and the case 15. Accordingly, when the buffer sheet 60 and the insulating film 67 are combined with each other, a resultant structure may have a shape of a hexahedron with a top opening.

As further illustrated in FIG. 8, a support plate hole 63a may be formed in the side support plate 63, so as to discharge the gas passed through the tab holes 31a and 32a. Accordingly, the gas generated from the inside of the electrode assembly 10 easily flows to the top of the case 15 through the tab holes 31a and 32a and the support plate hole 63a.

The bottom and the side springs 62 and 65 may be supported at their lateral edges by the rounded portion 15a of the case 15, so as to space the bottom support plate 61 and the side support plates 63 from the case 15 by a predetermined distance. Accordingly, the bottom and the side support plates 61 and 63 may be spaced apart from the inner surface of the case 15, so as to support the electrode assembly 10, so the buffer sheet 60 may absorb external impact or damps vibration.

The insulating film 67 may prevents the electrode assembly 10 and the case 15 from being short-circuited with each other. When the insulating film 67 is fused to the buffer sheet 60, the impact and vibrations are absorbed or damped, and the electrode assembly 10 and the case 15 are stably prevented from being short-circuited with each other.

According to exemplary embodiments, a buffer sheet may be positioned, e.g., to buffer, between an electrode assembly and a case. As such, the buffer sheet may prevent or substantially minimize impacts or vibrations on the electrode assembly.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
an electrode assembly in a battery case; and
a buffer sheet between the electrode assembly and the battery case, the buffer sheet contacting the electrode assembly and the battery case, and a center of the buffer sheet being spaced apart from a bottom of the battery case,
wherein the buffer sheet includes springs contacting the battery case, the springs being configured to exert spring force against the sidewalls of the battery case and to maintain a bottom of the buffer sheet spaced apart from the bottom of the battery case.

2. The rechargeable battery as claimed in claim 1, further comprising electrode terminals electrically connected to the electrode assembly, the buffer sheet and the electrode terminals being on opposite sides of the electrode assembly.

3. The rechargeable battery as claimed in claim 1, wherein the buffer sheet is a continuous flexible sheet extending along three to five different surfaces of the battery case.

4. The rechargeable battery as claimed in claim 3, wherein the buffer sheet overlaps five different surfaces of the electrode assembly.

5. The rechargeable battery as claimed in claim 3, wherein the buffer sheet is configured to deform during positioning inside the battery case.

6. The rechargeable battery as claimed in claim 1, wherein the buffer sheet includes at least one plate connected to springs, the plate contacting the electrode assembly and being spaced apart from the bottom of the battery case, and the springs extending from the plate to contact sidewalls of the battery case and being configured to deform when contacting the sidewalls of the battery case.

7. The rechargeable battery as claimed in claim 6, wherein the springs extend along lateral edges of the plate and are angled with respect to the plate when contacting the sidewalls of the battery case, the springs extending from the plate along respective sidewalls of the battery case and are configured to push against the sidewalls of the battery case.

8. The rechargeable battery as claimed in claim 1, wherein the buffer sheet includes at least one plate connected to springs, the plate contacting the electrode assembly and being spaced apart from the bottom of the battery case, and the springs curve away from the electrode assembly, the plate being between the springs and the electrode assembly.

9. The rechargeable battery as claimed in claim 6, further comprising an insulator between the springs and the electrode assembly.

10. The rechargeable battery as claimed in claim 6, wherein the buffer sheet includes three plates overlapping three different surfaces of the electrode assembly, each plate including springs on opposite edges and contacting opposite surfaces of the battery case.

11. The rechargeable battery as claimed in claim 10, wherein the springs of the three plates overlap two different surfaces of the battery case.

12. The rechargeable battery as claimed in claim 10, wherein the three plates of the buffer sheet extend along a bottom surface and two side surfaces of the battery case to have an inverted Π shape.

13. The rechargeable battery as claimed in claim 10, wherein two of the three plates contact first and second electrode tabs, the first and second electrode tabs connecting the electrode assembly to electrode terminals.

14. The rechargeable battery as claimed in claim 6, wherein the buffer sheet includes a first plate facing a bottom of the battery case and second and third plates facing sidewalls of the battery case, the first through third plates being integral.

15. The rechargeable battery as claimed in claim 6, wherein a sum of widths of the at least one plate and the springs is equal to or larger than a width of the battery case.

16. The rechargeable battery as claimed in claim 1, wherein:
 edges of a bottom of the battery case are curved, and
 a width of the buffer sheet outside the battery case is larger than a width between two opposite curved edges of the battery case, the widths of the buffer sheet and between the curved edges are measured along a same direction, and the buffer sheet being configured to deform against the curved edges when inside the battery case.

17. The rechargeable battery as claimed in claim 1, wherein a portion of the buffer sheet contacting the battery case contacts only sidewalls of the battery case, an empty space being defined inside the battery case between the buffer sheet and the bottom of the battery case.

18. The rechargeable battery as claimed in claim 17, wherein the buffer sheet is configured to push against the sidewalls of the battery case, the buffer sheet being stationary with respect to the battery case.

19. The rechargeable battery as claimed in claim 1, wherein an empty space is defined between the center of the buffer sheet and the bottom of the battery case.

* * * * *